(12) United States Patent
Thomas

(10) Patent No.: US 6,624,832 B1
(45) Date of Patent: Sep. 23, 2003

(54) METHODS, APPARATUS AND COMPUTER PROGRAM PRODUCTS FOR PROVIDING USER INPUT TO AN APPLICATION USING A CONTACT-SENSITIVE SURFACE

(75) Inventor: Eric Anthony Thomas, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 853 days.

(21) Appl. No.: 08/960,236

(22) Filed: Oct. 29, 1997

(51) Int. Cl.[7] .............................................. G06F 15/00
(52) U.S. Cl. ...................................... 345/863; 345/173
(58) Field of Search ................................. 345/173, 174, 345/175, 176, 177, 178, 179, 863, 723, 764; 178/18.01, 18.03, 18.04, 18.05, 18.06, 19.01, 19.02, 19.03, 19.04

(56) References Cited

U.S. PATENT DOCUMENTS 5,347,295 A * 9/1994 Agulnick et al. ............ 345/179
5,347,620 A * 9/1994 Zimmer ....................... 345/179
5,475,401 A * 12/1995 Verrier et al. ................ 345/179
5,793,360 A * 8/1998 Fleck et al. .................. 345/179

OTHER PUBLICATIONS

"Touch System Programmer's Guide", Carroll Touch, Touch Products, Aug. 1996, pp. 1–1–4–15.

* cited by examiner

Primary Examiner—Cao (Kevin) Nguyen
(74) Attorney, Agent, or Firm—Myers Bigel Sibley & Sajovec

(57) ABSTRACT

User input is provided to an application resident on a data processing system by contacting a contact-sensitive surface of a user input device such as a touch screen with an implement configured to produce a contact point configuration including at least one contact point. The contact point configuration is identified, and a user input mode is identified based on the identified contact point configuration. The at least one contact point is then processed in the application based on the identified user input mode. The contact-sensitive surface may be contacted with an implement having first and second ends configured to produce respective first and second contact point configurations when placed against the contact-sensitive surface.

13 Claims, 3 Drawing Sheets

METHODS, APPARATUS AND COMPUTER PROGRAM PRODUCTS FOR PROVIDING USER INPUT TO AN APPLICATION USING A CONTACT-SENSITIVE SURFACE

FIELD OF THE INVENTION

The present invention relates to data processing methods and apparatus, more particularly, to methods, apparatus and computer program products for providing user input to an application.

BACKGROUND OF THE INVENTION

Contact sensitive user input devices such as touch screens are commonly used to provide user input to such devices as personal computers, information kiosks, pen-based computers and the like. Typically, contact-sensitive user input devices include devices employing resistive, capacitive and surface acoustic wave (SAW) surface transducers. As is well-known to those of ordinary skill in the art, resistive and capacitive devices typically operate by producing a signal that is altered by impedance changes induced by pressure applied to a specially-designed conductive or capacitive sheet. SAW devices operate by propagating acoustic waves across a surface such as the glass surface of a cathode ray tube (CRT) in a uniform manner, and detecting disturbances in the propagation of these waves caused by the contact of a finger or other object with the surface.

Contact-sensitive user input devices typically produce a signal that has a signature that indicates a location on the transducer surface at which contact occurs. Control circuits typically process the signal to generate x and y coordinates for the point of contact. For example, a touch screen controller may receive input signals from the touch screen or pad and process the received signals to provide coordinate information in a format that can be used by a conventional mouse event handler in an application to perform tasks such as drawing a graphic object, clicking a button, dragging or dropping an object or the like. In a pen-based computer, for example, a pen may be used to contact a contact-sensitive surface to select various user options, as well as to provide text and other graphic inputs to an application running on the pen-based computer.

Conventional touch screen applications may be limited to providing user input according to a fixed user input mode, e.g., to selecting buttons on a information kiosk screen, or may require preselection of a user input mode before coordinate data from the touch screen is processed. For example, in a typical graphics editing application in which objects are drawn and manipulated on a page depicted on a computer screen, a user preselects a user input mode, e.g., clicks a button to select a virtual drawing tool which is configured to draw a line, select an object, paint an object or the like. Coordinate inputs from a graphic input device such as a touch screen, digitizer or mouse are then processed according to the behavioral characteristics of the identified virtual drawing tool. Although this approach can provide a useful interface, it may require operations that may be counterintuitive in the context of the drawing page metaphor. For example, a user may be required to select a virtual "pencil" to draw a line and then must choose a "select" tool to highlight the line for erasure, while in a real drawing environment both operations may be performed by a single tool, i.e., a pencil with an eraser on one end.

SUMMARY OF THE INVENTION

In light of the foregoing, it is an object of the present invention to provide methods, apparatus and computer program products for providing user inputs to an application that can provide a more intuitive user interface.

It is another object of the present invention to provide methods, apparatus and computer program products for providing user inputs to an application that can be implemented using conventional touch screens or other contact-sensitive user input devices.

These and other objects, features and advantages are provided according to the present invention by methods and apparatus which provide user input to an application by contacting a contact-sensitive surface such as a touch screen with an implement having a contact surface that produces a distinctive contact point configuration on the contact-sensitive surface. The contact point configuration is identified and the contact points are processed according to the identified contact point configuration. According to one embodiment, a user may contact the contact-sensitive surface with one end of an implement having a first end which produces a first contact point configuration and a second end which produces a contact point configuration different than the first contact point configuration. For example, the implement may be a stylus having a first end with a signal point that produces a single contact point when placed against a contact-sensitive surface, and a second end with multiple points that produce multiple contact points when placed against the contact-sensitive surface.

In particular, according to the present invention, user input is provided to an application resident on a data processing system by contacting a contact-sensitive surface of a user input device with an implement configured to produce a contact point configuration including at least one contact point. The contact point configuration is identified, and a user input mode is identified based on the identified contact point configuration. The at least one contact point is processed in the application based on the identified user input mode. The implement may have first and second ends configured to produce respective first and second contact point configurations when placed against the contact-sensitive surface.

According to one embodiment of the present invention, the implement comprises a stylus having first and second ends. According to another embodiment, the user input device comprises a screen having a contact-sensitive surface, the screen being configured to provide a graphical display for the application. The application may be configured to display a graphical workpiece on the screen, and a user input mode may be identified by identifying a virtual tool having a predetermined behavior with respect to the graphical workpiece. The at least one contact point may be processed by performing a drawing operation on the graphical workpiece according to the behavior of the identified virtual tool.

A system according to the present invention comprises a user input device that includes a contact-sensitive surface and which is configured to produce a signal indicative of contact on an object with the contact-sensitive surface. A data processor is operatively associated with the user input device and includes an application configured to identify a contact point configuration including at least one contact point produced by contact of an object with the contact-sensitive surface, to select a user input mode based on the identified contact point configuration and to process the at least one contact point based on the identified user input mode. The user input device may comprise a screen having a contact-sensitive surface, the screen being configured to provide a graphical display for the application. The application may be configured to display a graphical workpiece on the screen, to identify a virtual tool having a predetermined behavior with respect to the graphical workpiece, and to perform a drawing operation on the graphical workpiece according to the behavior of the identified virtual tool.

According to another aspect of the present invention, a computer program product is provided that includes a computer-readable storage medium having computer-readable program code means embodied therein. The computer-readable program code means includes first computer-readable program code means for identifying a contact point configuration from at least one contact point, second computer-readable program code means, responsive to the first computer-readable program code means, for identifying a user input mode based on the identified contact point configuration, and third computer-readable program code means, responsive to the first computer-readable program code means, for processing the at least one contact point in the application based on the identified user input mode. The second computer-readable program code means may comprise computer-readable program code means for identifying a virtual tool having a predetermined behavior with respect to a graphical workpiece. The third computer-readable program code means may comprise computer-readable program code means for performing a drawing operation on the graphical workpiece according to the behavior of the identified virtual tool. Improved user input methods, apparatus and computer program products are thereby provided.

DESCRIPTION OF THE DRAWINGS

Some of the objects and advantages of the present invention having been stated, others will be more fully understood from the detailed description that follows and by reference to the accompanying drawings in which.

DESCRIPTION OF PREFERRED EMBODIMENTS

Figure 1:
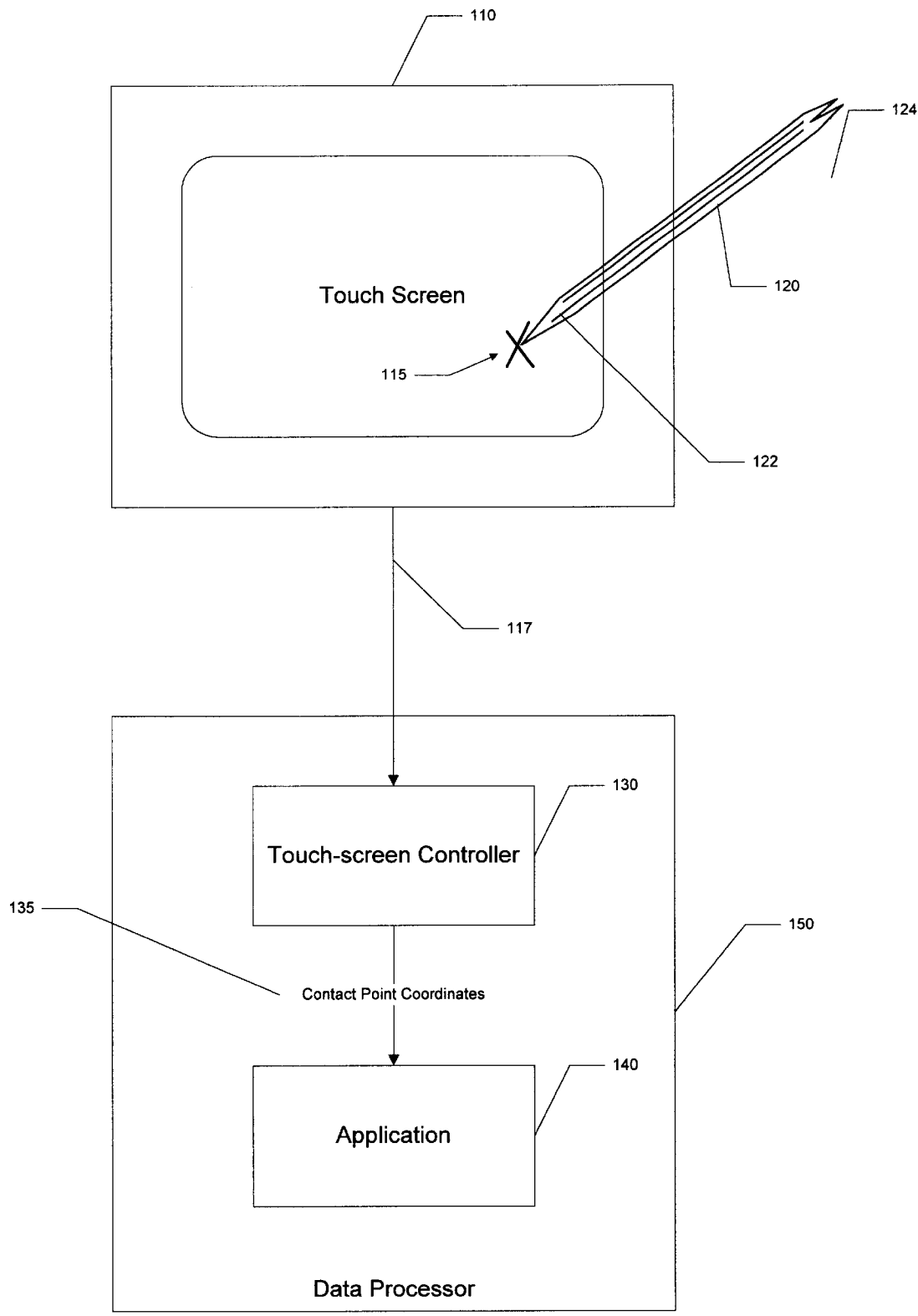
FIG. 1 is a schematic illustration of an embodiment of a system according to the present invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Referring to FIG. 1, a system according to the present invention includes a user input device having a contact-sensitive surface, such as a contact-sensitive touch screen 110. An implement, e.g., a stylus 120 has a first end 122 and second 124, each of which produces a unique contact point configuration including at least one contact point 115 when placed in contact with the touch screen 110. A data processor 150 is responsive to the touch screen 110, for identifying the contact point configuration for the at least one contact point 115 and for processing the at least one contact point 115 according to a user input mode identified based on the identified contact point configuration. For example, the data processor 150 may include a touch screen controller 130 that receives a signal 117 from the touch screen 110, and that produces at least one contact point coordinate 135 therefrom. An application 140 resident at the data processor 150 processes the at least one contact point coordinate 135 to identify a user input mode from the contact configuration for the at least one contact point 115, and further processes the at least one contact point coordinate 135 according to the identified user input mode.

The contact sensitive surface of the illustrated embodiment preferably is a type of contact-sensitive surface such as a surface acoustic wave touch screen that is capable of simultaneously identifying multiple contact points. An example of such a surfaces are the scanning infrared touch systems produced by Carroll Touch Co. and described in *Touch System Programmer's Guide*, pp. 1-1 through 1-7 and 4-1 through 4-15, published August 1996 by the Carroll Touch Co. and incorporated herein by reference in its entirety. Those skilled in the art will appreciate that the contact sensitive surface may be embodied in types of user input devices other than a touch screen, such as a tablet, pad or similar device, and may employ other detection techniques than infrared detection, such as resistive or capacitive detection techniques.

The data processor 150 may include a variety of devices that are configured to receive and process user inputs from a contact-sensitive surface. These devices may include, for example, personal computers, information kiosks and televisions, as well as portable devices such as palmtop computers, personal digital assistants (PDAs) and the like. These devices may have applications resident thereat, such as word processing programs, computer-aided-drafting programs and the like, which are configured to process inputs from a contact-sensitive surface to perform such operations as text entry, graphics editing, object selection and manipulation and the like.

Figure 2:
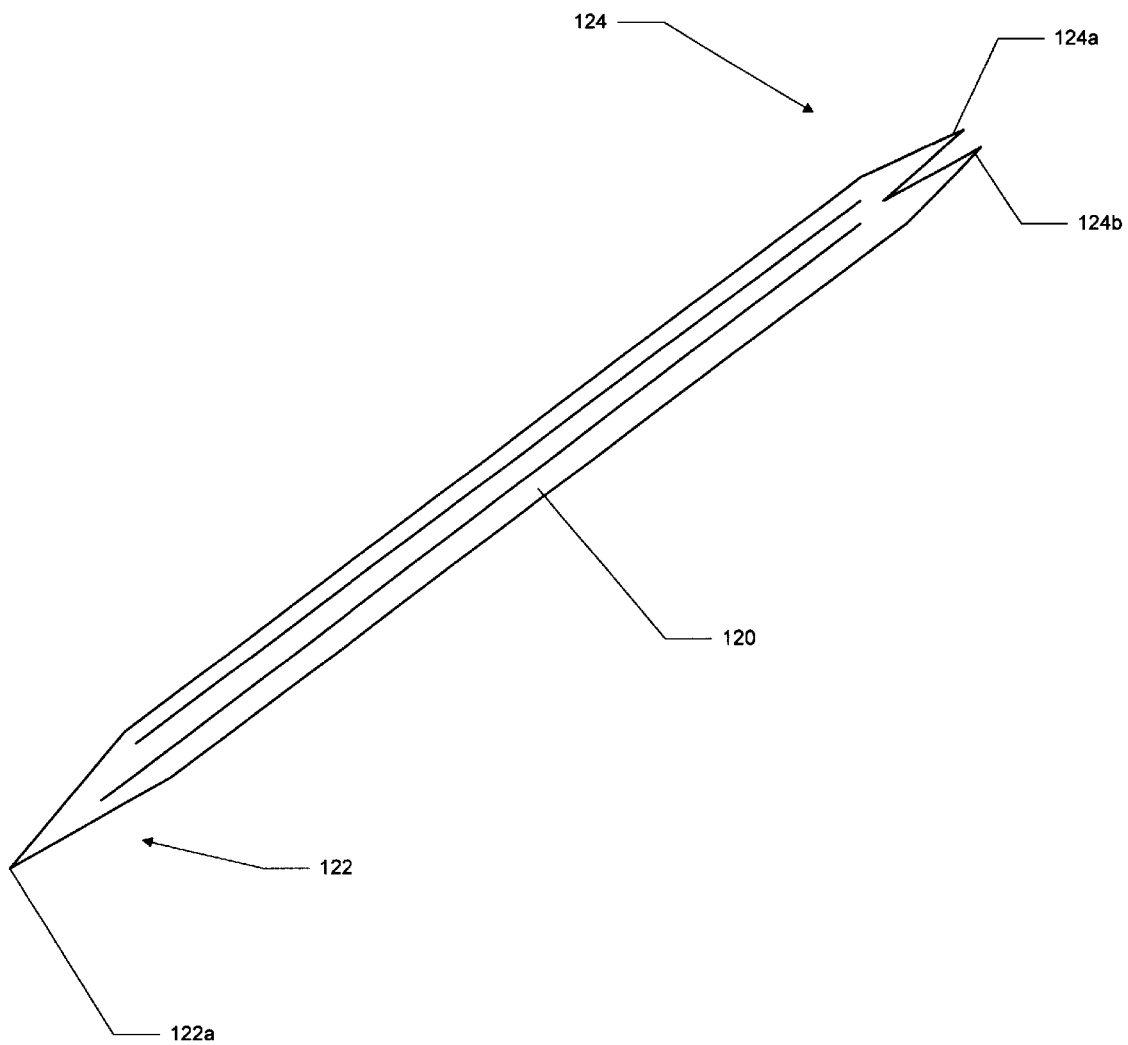
FIG. 2 illustrates a stylus for providing user input to an application according to an embodiment of the present invention.

FIG. 2 illustrates an embodiment of a stylus 120 configured to provide user input to an application via a contact-sensitive screen. The stylus 120 includes first and second ends 122, 124, each of which provide unique contact point configurations when placed against a contact-sensitive surface such as a touch screen. As shown, the first end 122 includes a single point 122a. As those skilled in the art will appreciate, for a relatively low-resolution contact-sensitive surface the point 122a may produce a single contact point when placed against surface, and may produce a tightly grouped cluster of contact points when placed against a higher-resolution contact-sensitive surface. The second end 124 includes multiple spaced-apart points 124a, 124b which produce a distinctively different contact point configuration than the first end 122 when placed against a contact-sensitive surface.

Those skilled in the art will appreciate that implements other than the stylus 120 illustrated in FIG. 2 may be used with the present invention. For example, a more pencil-like implement could be used that includes a sharp point at one end and a blunt, eraser-like surface at the other end. The "eraser" end could be differentiated from the sharp point by the larger and more widely distributed array of contact points that the eraser end produces when contacting the contact-sensitive surface. In a handwriting application, for example, input from the sharply pointed end could be interpreted as handwriting, while input from the blunt end could be interpreted as erasure. Those skilled in the art will appreciate that, in general, a wide variety of implements having distinctive contact surfaces could be used to provide a variety of different user inputs according to the present invention.

Figure 3:
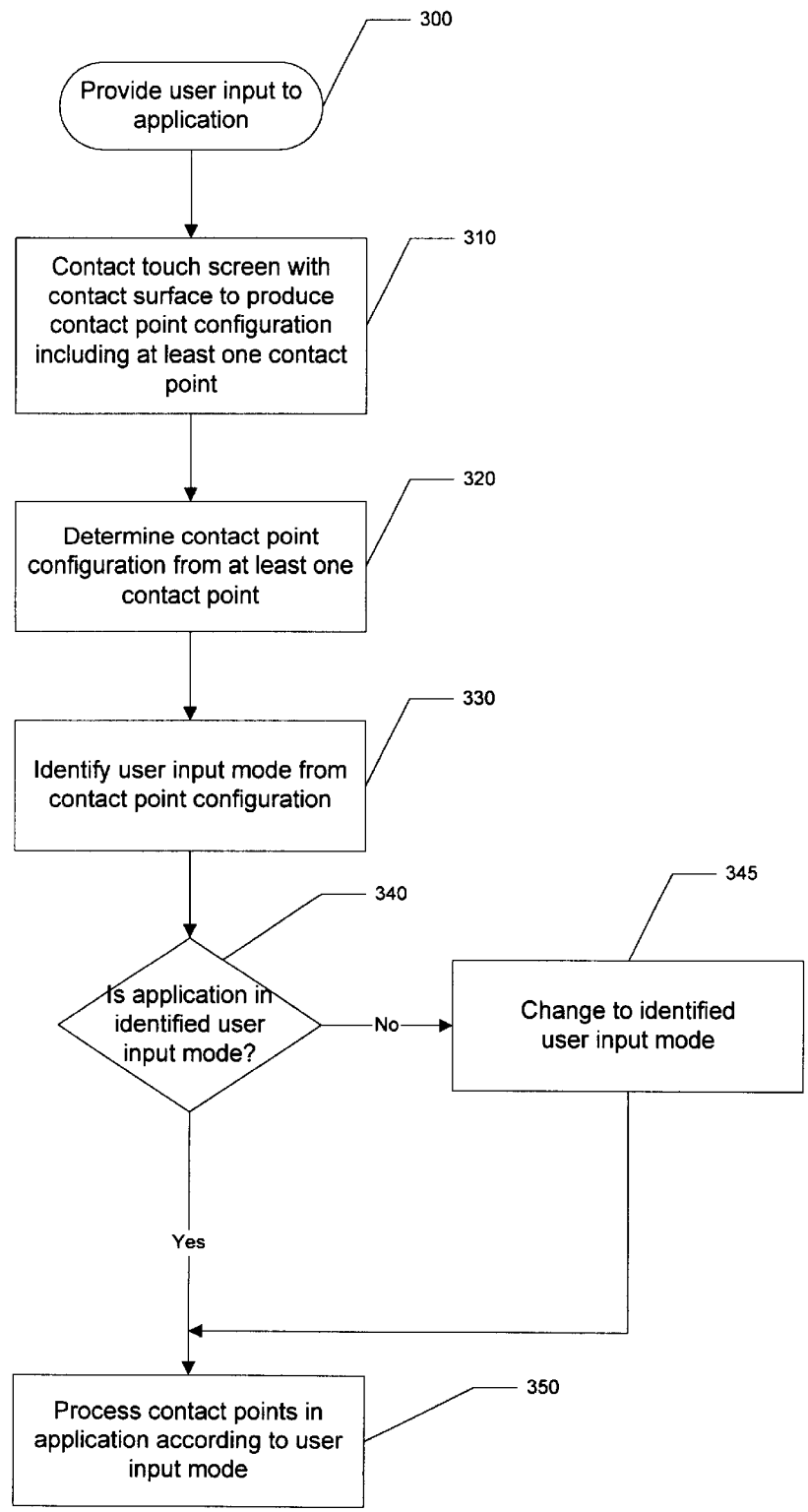
FIG. 3 is a flowchart illustration of operations for providing user input to an application according to an embodiment of the present invention.

The flowchart illustration of FIG. 3 illustrates methods, apparatus (systems) and computer program products for providing user input to an application according to the present invention. It will be understood that blocks of the flowchart illustration, and combinations of blocks in the flowchart illustration, can be implemented by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart illustration support combinations of means for performing the specified functions, combinations of steps for performing the specified functions, and computer-readable program code means for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

Referring to FIG. 3, exemplary operations (Block 300) for providing user input to an application according to the present invention include contacting a contact-sensitive surface such as a touch screen with a contact surface of an implement to produce a contact point configuration including at least one contact point (Block 310). The contact point configuration is identified (Block 320), and a user input mode is identified based on the identified contact point configuration (Block 330). The application next determines if it is in the identified user input mode (Block 340). If it is, the application can proceed to process the contact points according to that user input mode (Block 350). If the application determines that it is not in the proper user input mode, it changes to the identified user input mode (Block 345) and then processes the contact points accordingly (Block 350).

Those skilled in the art will appreciate that the processing operations (Block 350) may include a variety of text-processing, graphics-processing or other operations. In an exemplary embodiment, the contact point configurations produced by an implement could correspond to a plurality of "virtual" drawing tools for acting of a drawing page workpiece in a drawing application. The virtual tools might comprise, for example, a pencil, a paintbrush and an eraser, each of which have particular behavioral characteristics. When a selected surface of the implement is brought into contact with the contact-sensitive surface as part of a user input operation, the application may react by performing a graphic operation, e.g., a drawing operation, according to the behavioral characteristics of the corresponding virtual drawing tool.

Those skilled in the art will also appreciate that several variations to the operations illustrated in FIG. 3 may be performed within the scope of the present invention. For example, the application may perform a variety of calibration or other data processing operations upon the contact point information received from the contact-sensitive surface before identifying the contact point configuration to compensate for non-linearity or other distortion arising from irregularities in the contact-sensitive surface, environmental factors or the like.

In the drawings and specification, there have been disclosed typical embodiments of the invention and, although specific terms are employed, they are used in a generic and descriptive sense only and not for purposes of limitation, the scope of the invention being set forth in the following claims That which is claimed is:

1. A method of providing user input to an application resident on a data processing system, the method comprising the steps of:

contacting a contact-sensitive surface of a user input device with an implement configured to produce a contact point configuration including at least one contact point;

identifying the contact point configuration;

identifying a user input mode based on the identified contact point configuration; and processing the at least one contact point in the application based on the identified user input mode.

2. A method according to claim 1, wherein said step of contacting comprises the step of contacting the contact-sensitive surface with an implement having first and second ends configured to produce respective first and second contact point configurations when placed against the contact-sensitive surface.

3. A method according to claim 2, wherein the implement comprises a stylus having first and second ends, wherein said step of contacting comprises the step of contacting the contact-sensitive screen with one of the first and second ends of the stylus.

4. A method according to claim 1, wherein the user input device comprises a screen having a contact-sensitive surface, the screen being configured to provide a graphical display for the application.

5. A method according to claim 3, wherein the user input device comprises a screen having a contact-sensitive surface, the screen being configured to provide a graphical display for the application.

6. A method according to claim 4, wherein the application is configured to display a graphical workpiece on the screen, wherein said step of identifying a user input mode comprises the step of identifying a virtual tool having a predetermined behavior with respect to the graphical workpiece, and wherein said step of processing comprises the step of performing a drawing operation on the graphical workpiece according to the behavior of the identified virtual tool.

7. A method according to claim 5, wherein the application is configured to display a graphical workpiece on the screen, wherein said step of identifying a user input mode comprises the step of identifying a virtual tool having a predetermined behavior with respect to the graphical workpiece, and wherein said step of processing comprises the step of performing a drawing operation on the graphical workpiece according to the behavior of the identified virtual tool.

8. A method according to claim 1, wherein the user input mode comprises one of a write mode and an erase mode.

9. A system, comprising:

a user input device which includes a contact-sensitive surface and which is configured to produce a signal indicative of contact of an object with said contact-sensitive surface; and a data processor, operatively associated with said user input device, which includes an application configured to identify a contact point configuration including at least one contact point produced by contact of an object with said contact-sensitive surface, to identify a user input mode based on the identified contact point configuration and to process the at least one contact point based on the identified user input mode.

10. A system according to claim 9, wherein the user input device comprises a screen having a contact-sensitive surface, said screen being configured to provide a graphical display for the application.

11. A system according to claim 10, wherein the application is configured to display a graphical workpiece on said screen, to identify a virtual tool having a predetermined behavior with respect to the graphical workpiece, and to perform a drawing operation on the graphical workpiece according to the behavior of the identified virtual tool.

12. A computer program product, comprising:

a computer-readable program storage medium having computer-readable program code means embodied therein, said computer-readable program code means comprising:

first computer-readable program code means for identifying a contact point configuration from at least one contact point;

second computer-readable program code means, responsive to said first computer-readable program code means, for identifying a user input mode based on the identified contact point configuration; and third computer-readable program code means, responsive to said first computer-readable program code means, for processing the at least one contact point in the application based on the identified user input mode.

13. A computer program product according to claim 12, wherein said second computer-readable program code means comprises computer-readable program code means for identifying a virtual tool having a predetermined behavior with respect to a graphical workpiece; and wherein said third computer-readable program code means comprises computer-readable program code means for performing a drawing operation on the graphical workpiece according to the behavior of the identified virtual tool.

* * * * *